United States Patent [19]
Hirs

[11] Patent Number: 5,139,670
[45] Date of Patent: Aug. 18, 1992

[54] ROTATING DRUM FILTER

[76] Inventor: Gene Hirs, 6865 Meadowlake Dr., Birmingham, Mich. 48010

[21] Appl. No.: 688,859

[22] Filed: Apr. 22, 1991

[51] Int. Cl.$^5$ .................... B01D 33/11; B01D 33/50
[52] U.S. Cl. .................................... 210/394; 210/402; 210/499
[58] Field of Search ............... 210/394, 402, 499, 784, 210/791, 391; 55/511

[56] References Cited

U.S. PATENT DOCUMENTS

| | | | |
|---|---|---|---|
| 2,653,521 | 9/1953 | Ahlfors | 210/394 |
| 3,127,259 | 3/1964 | Boylan | 55/511 |
| 4,022,695 | 5/1977 | Howard et al. | 210/486 |
| 4,154,588 | 5/1979 | Herndon, Jr. | 55/283 |
| 4,869,823 | 9/1989 | Otani et al. | 210/394 |

Primary Examiner—Robert A. Dawson
Assistant Examiner—Matthew O. Savage
Attorney, Agent, or Firm—Lyon & Delevie

[57] ABSTRACT

A liquid filter comprises a cloth filter media in the form of a drum. Contaminated liquid flows into the interior of the drum thence radially outwardly through the cloth filter media as the filter rotates. Sludge is constantly backwashed from the filter media by pressurized liquid in the reverse direction of filtration. Flexibility of the cloth filter media materially enhances backwashing efficiency. Sludge is collected by a collector internally of the drum.

1 Claim, 3 Drawing Sheets

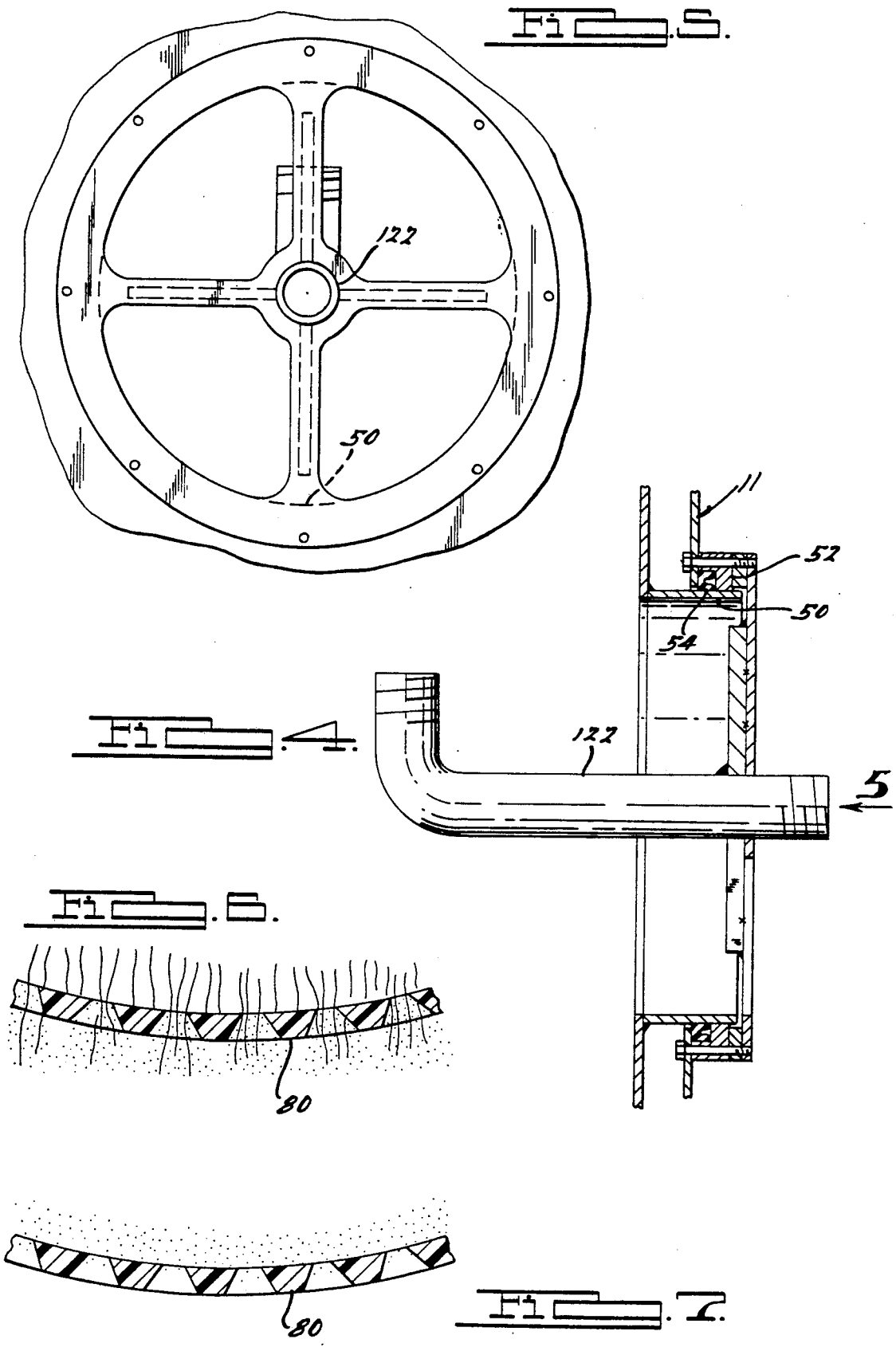

ROTATING DRUM FILTER

BACKGROUND OF THE INVENTION

Many industrial applications for liquid filters do not require submicronic particle removal from the liquids passing through the filter. In such situations, a permanent filter media or screen can be employed. However, permanent filter medias require periodic cleaning of the filter screen or media. Heretofore, such filters have employed scrapers or the like, as taught in my U.S. Pat. No. 4,826,589.

SUMMARY OF THE INVENTION

The present invention relates to a liquid filter comprising a pair of spaced disks that support a flexible permanent filter media, for example, finely woven mono filament polypropylene or polyester cloth. The cloth filter media is in the form of a belt that spans the spaced disks so as to form a drum. Contaminated liquid flows into the interior of the drum thence radially outwardly through the cloth filter media. The filter rotates constantly, the speed of rotation being controlled in relation to the amount of sludge buildup on the radially inner surface of the cloth filter media. Sludge is constantly backwashed from the filter media by pressurized liquid flowing from a series of nozzles disposed exteriorly of the filter drum at the top thereof. Backwashing is in the reverse direction of filtration, flexibility of the cloth filter media materially enhancing backwashing efficiency. Sludge is collected by a collector on the interior of the drum for discharge to an external settling tank.

BRIEF DESCRIPTION OF THE DRAWINGS

FIG. 4 is an enlarged view taken within the circle 4 of FIG. 1.

FIG. 5 is a view taken in the direction of the arrow 5 of FIG. 4.

FIG. 6 is a view taken within the circle 6 of FIG. 1.

FIG. 7 is a view taken within the circle 7 of FIG. 1.

DETAILED DESCRIPTION OF A PREFERRED EMBODIMENT OF THE INVENTION

Figure 1:
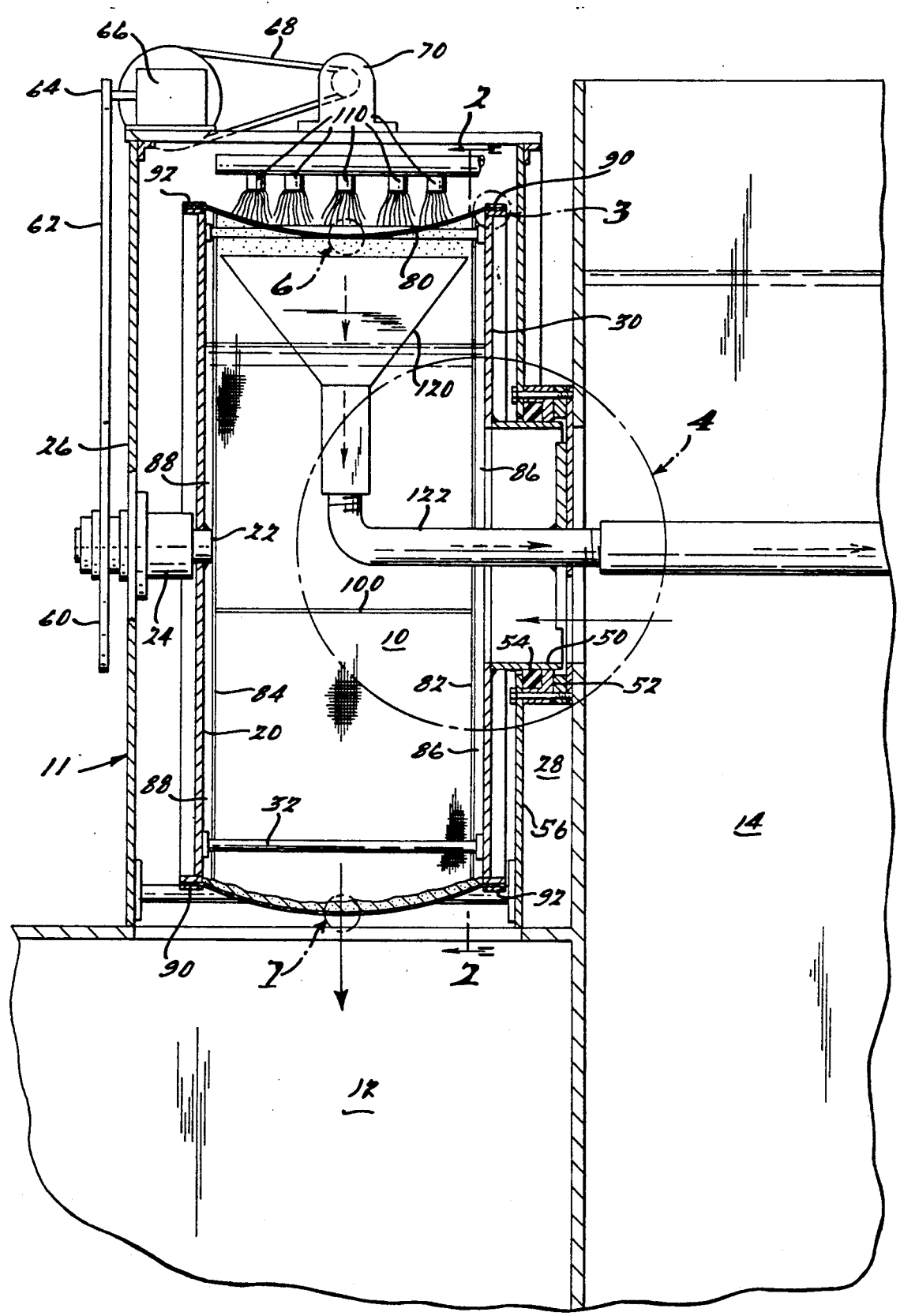
FIG. 1 is a side elevational view, partially in section, of the filter of the invention.

As seen in FIG. 1 of the drawing, a filter 10, in accordance with a preferred constructed embodiment of the instant invention, is shown disposed internally of a filter housing 11 that is disposed in liquid flow relationship between a clean liquid tank 12 and a contaminated fluid tank 14. The filter 10 is adapted to receive contaminated liquid from the contaminated liquid tank 14, filter the liquid, and pass the filtered liquid to the clean tank 12.

The filter 10 comprises an imperforate disk 20 having a central shaft 22 journaled in a bearing 24. The bearing 24 is supported by an outer wall 26 of the filter 10. A second filter disk 30 is coaxially aligned with the disk 20 and connected thereto by a plurality of connecting rods 32-46. The disk 30 has an open, centrally disclosed sleeve 50 that is journaled in a complementary bearing 52. Unfiltered fluid enters the filter 10 through the sleeve 50. A seal 54 is disposed between the sleeve 50 and bearing 52 to ensure that unfiltered fluid flowing from the tank 14 cannot flow directly into the filtered fluid tank 12. The bearing 52 is supported by a wall 56 of the filter housing 11.

The filter 10 is rotated by a pulley or sprocket 60 which is driven, through a belt or chain 62, by a drive sprocket or pulley 64 on a speed reducer 66. The speed reducer 66 is driven through a belt or chain 68 by an electric motor 70.

Figure 3:
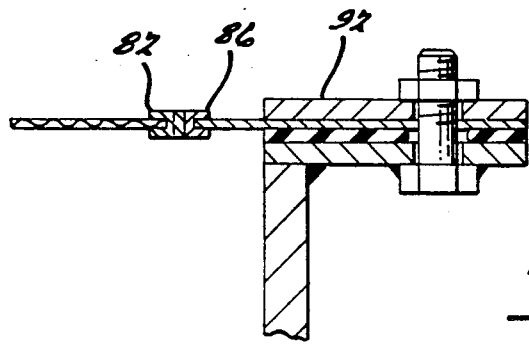
FIG. 3 is an enlarged view taken within the circle 3 of FIG. 1.

In accordance with the instant invention, filtration of the unfiltered liquid flowing from the tank 14 to the interior of the filter 10 is effected by passage of the liquid through a filter media in the form of a polypropylene or polyester cloth media belt 80. The media belt cloth 80 is disposed exteriorly of the rods 32-46 that connect the disks 26 and 30. The belt 80 is provided with zipper elements 82 and 84 on opposite edges thereof that cooperate with complementary zipper elements 86 and 88 which are secured to the periphery of the disks 30 and 20, respectively, as by retainer bands 90 and 92, (see FIG. 3). Opposite ends of the media belt 80 may be joined to one another by a longitudinally extending zipper 100.

Figure 2:
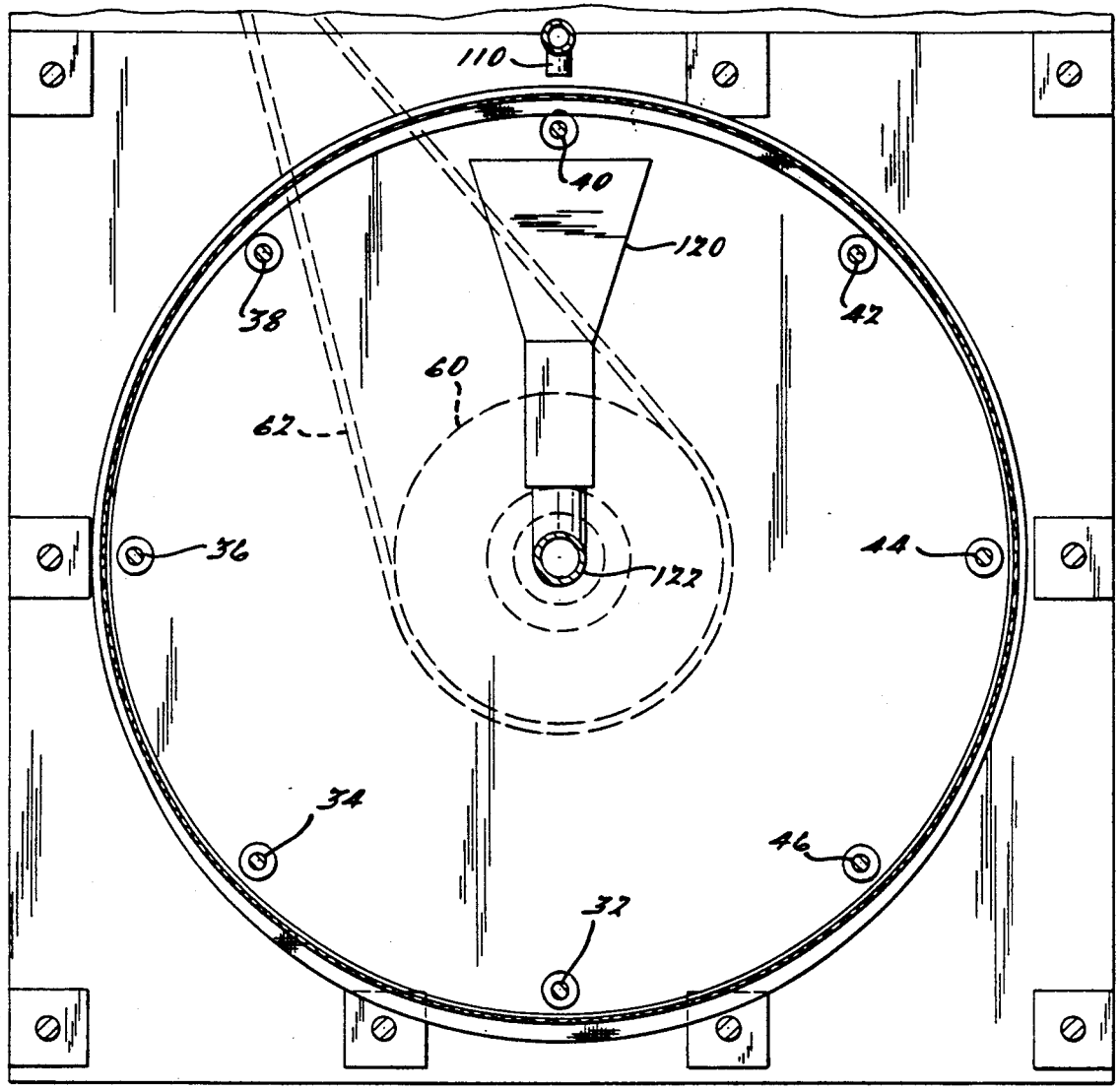
FIG. 2 is a view taken along the line 2—2 of FIG. 1.

As seen in FIGS. 1 and 2 of the drawing, backwash of the media belt 80 of the filter 10 is achieved by pressurized liquid flowing from a plurality of nozzles 110 disposed exteriorly of the media belt 80 at the upper extremity thereof. The nozzles 110 are supplied with pressurized filtered liquid from the tank 12 or an external source of fresh water. The backwash liquid is directed downwardly against the media belt 80 in a manner that forces the cloth media belt 80 to bow downwardly or radially inwardly, as seen in FIGS. 1 and 6 of the drawings, thereby elongating the internal surface on which contaminants are collected so as to aid in removal of the contaminants from the cloth media belt 80.

As best seen by comparing FIGS. 6 and 7, contaminant buildup on the media belt 80 results in a radially outwardly convex layer of contaminants due to fluid flow radially outwardly of the filter 10. When the contaminants illustrated in FIG. 7 are rotated to the upper most position shown in FIGS. 1 and 6, liquid flow from the nozzles 110 effects reversal of the direction of flexure of the media belt 80 from radially outwardly to radially inwardly. The aforesaid reversal and deflection of the filter media to a radially inwardly concave condition results in elongation of the contaminant layer, which in turn results in cracking and separation thereof from the media belt 80 materially aiding in removal of the contaminants from the media belt 80. During filtration, the media is under approximately 1 P.S.I. pressure. During backwash the pressure is approximately 40 P.S.I.

In accordance with another feature of the instant invention, contaminants removed from the inner surface of the media belt 80 are collected in a contaminant collector 120 having an outlet pipe 122 extending through the center of the rotatable filter disk 30 and sleeve 50 to the exterior of the tank 14, thence to a sludge settling tank (not shown).

From the foregoing it should be apparent that the filter 10 of the present invention is continuous in operation since backwash of the media belt 80 does not require that filtration be interupted. The media belt 80 is biased to a radially outwardly convex condition during filtration due to liquid flow from the inside of the filter 10 radially outwardly to the outside of the filter 10. During backwash, the media belt 80 is biased to a radially inwardly concave position due to impact of liquid jets on the exterior of the belt 80. Reversing of the media belt 80 effects cracking of the sludge layer on the inner surface thereof and expansion of the apertures therein to facilitate backwash.

While the preferred embodiment of the invention has been disclosed, it should be appreciated that the invention is susceptible of modification without departing from the scope of the following claims.

I claim:

1. A liquid filter comprising a flexible liquid permeable cylindrical filter media formed of a woven cloth having a plurality of discrete spaced apertures therein, said cylindrical filter media having a central horizontally disposed axis, a pair of discs axially spaced along a central axis, said discs having outer radial edges respectively attached to opposite ends of the cylindrical filter media for rotation about its central axis, the out radial edges of said discs providing the sole support for said cylindrical filter media whereby said media is free to deflect radially at all points between said discs, an inlet pipe extending through one of said discs for admitting unfiltered liquid to the interior of said cylindrical filter media, a filtered liquid tank disposed under said cylindrical media for collecting liquid flowing downwardly and radially outwardly through said media whereby contaminants are collected on the radially interior surface of said media, a plurality of backwash nozzles disposed exteriorly and above said cylindrical filter media for directing a flow of high pressure liquid radially inwardly and directly against the exterior surface of said cylindrical filter media whereby the entire length of said cylindrical media is deflected downwardly so as to enlarge each of the apertures therein and facilitate removal of contaminants collected on the radially inner surface thereof, a stationary contaminant collector disposed internally of said cylindrical filter media and underlying said backwash nozzles on the opposite side of said media from said nozzles, an outlet pipe extending through one of said discs and connected to said collector for conveying contaminants to the exterior of said filter, and means for rotating said discs and said cylindrical filter media about said central axis.

* * * * *